United States Patent
Tsuzuku et al.

(10) Patent No.: US 11,361,030 B2
(45) Date of Patent: Jun. 14, 2022

(54) POSITIVE/NEGATIVE FACET IDENTIFICATION IN SIMILAR DOCUMENTS TO SEARCH CONTEXT

(71) Applicant: INTERNATIONAL BUSINESS MACHINES CORPORATION, Armonk, NY (US)

(72) Inventors: Daiki Tsuzuku, Tokyo (JP); Tohru Hasegawa, Tokyo (JP); Shunsuke Ishikawa, Tokyo (JP); Keisuke Nitta, Tokyo (JP); Yasumasa Kajinaga, Tokyo (JP); Masaki Komedani, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 16/697,247

(22) Filed: Nov. 27, 2019

(65) Prior Publication Data

US 2021/0157856 A1    May 27, 2021

(51) Int. Cl.
*G06F 16/9032* (2019.01)
*G06F 16/9038* (2019.01)
*G06F 40/30* (2020.01)

(52) U.S. Cl.
CPC .... *G06F 16/90332* (2019.01); *G06F 16/9038* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 8,135,708 B2 * | 3/2012 | Morton | G06F 16/951 707/726 |
| 8,433,705 B1 * | 4/2013 | Dredze | G06F 16/24578 707/723 |
| 8,694,505 B2 * | 4/2014 | Lane | G06F 17/3064 707/738 |
| 8,935,249 B2 | 1/2015 | Traub et al. | |
| 9,251,279 B2 * | 2/2016 | Mihalik | G06F 16/2428 |

(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

*Primary Examiner* — Shaun Roberts
(74) *Attorney, Agent, or Firm* — Michael A. Petrocelli, Esq.; Kevin P. Radigan, Esq.; Heslin Rothenberg Farley & Mesiti P.C.

(57) ABSTRACT

Facet-based search processing is provided which includes receiving a query search context for querying documents of a document set, and retrieving, by similar document search processing, a document subset from the document set. The document subset includes documents of the set most similar to a search document of the query search context. Facet analysis processing is used to generate M candidate facets most-related to the query search context, and facets of the M candidate facets associated with documents of the subset are identified, and classified into a positive facet set and a negative facet set based, at least in part, on extent of facet commonality across the documents. A listing is of the documents in the document subset is provided, with the listing highlighting facets of the positive facet set.

20 Claims, 13 Drawing Sheets

(56) References Cited

U.S. PATENT DOCUMENTS

| | | | |
|---|---|---|---|
| 9,378,248 B2* | 6/2016 | Uefuji | G06F 16/24578 |
| 2007/0050393 A1* | 3/2007 | Vogel | G06F 16/367 |
| | | | 707/999.102 |
| 2009/0006438 A1* | 1/2009 | Tunkelang | G06F 16/245 |
| | | | 711/E12.024 |
| 2009/0198668 A1* | 8/2009 | Jean Bolf | G06F 16/3334 |
| | | | 707/999.005 |
| 2009/0327271 A1* | 12/2009 | Amitay | G06F 16/334 |
| | | | 707/999.005 |
| 2012/0173521 A1* | 7/2012 | Lam | G06F 16/9535 |
| | | | 707/723 |
| 2012/0191740 A1* | 7/2012 | Moehrle | G06F 40/194 |
| | | | 707/758 |
| 2013/0103681 A1* | 4/2013 | Renders | G06F 16/14 |
| | | | 707/E17.014 |
| 2014/0280284 A1* | 9/2014 | Emanuel | G06F 16/93 |
| | | | 707/766 |
| 2015/0220647 A1* | 8/2015 | Gangwani | G06F 16/951 |
| | | | 707/731 |
| 2018/0196869 A1* | 7/2018 | Altaf | G06F 16/3329 |
| 2018/0285341 A1 | 10/2018 | Ishikawa et al. | |
| 2018/0300308 A1* | 10/2018 | Kabeya | G06F 40/211 |
| 2019/0188304 A1 | 6/2019 | Fukuda et al. | |

* cited by examiner

Search Similar Documents ⊗

*file:///wexdata/check/short_android.json?converter-id=19&317*

Oftentimes I don't know where I placed my Android. What app would you recommend to allow me to send an email that will cause vibrate and emit high volume sounds/music that will help me find it? — 200

50 ▼ 1 - 50 of 276  <  1  >

| Title | Date |
|---|---|

*file:///wexdata/check/short_android.json?converter-id=19&110*

I just lost my phone today and I don't have any Find Me app but I am logged in with all of my information.
Like my email, facebook, and such things. How can I possibly find it?
I also know that my GPS is set On. — 201

*file:///wexdata/check/short_android.json?converter-id=19&496*

3 weeks ago I lost my Samsung Galaxy Ace. I don't have any tracker applications or any "if lost" applications installed.
I'm looking for some tracker that doesn't need a sim card, just a locator using gps locator, but I also don't have any IMEI number or even email. So please help me, is there any way to find my lost Samsung Galaxy Ace 5583O? — 202

*file:///wexdata/check/short_android.json?converter-id=19&413*

Possible Duplicate: An app to locate my Android device around the house?
I'm looking for a "find my phone" app that can be activated from another app instead of a webpage.
The scenario is simple, my wife misplaces her android phone frequently.
I'd like to be able to quickly launch an app from my android phone or tablet and activate a find me siren on her device. — 203

*file:///wexdata/check/short_android.json?converter-id=19&1043*

Why is Google Play Music constantly running on my galaxy s4? I don't use any music app.

FIG. 2

Search Similar Documents ⊗

*file:///wexdata/check/short_android.json?converter-id=19&317*

Oftentimes I don't know where I placed my Android. What app would you recommend to allow me to send an email that will cause vibrate and emit high volume sounds/music that will help me find it?

50 ▼ 1 - 50 of 276 < 1 >

| Title | | Date |
|---|---|---|

*file:///wexdata/check/short_android.json?converter-id=19&110*

I just lost my phone today and I don't have any Find Me app but I am logged in with all of my information. Like my email, facebook and such things. How can possibly find it? I also know that my GPS is set On.

*file:///wexdata/check/short_android.json?converter-id=19&496*

3 weeks ago I lost my Samsung Galaxy Ace. I don't have any tracker applications or any "if lost" applications installed. I'm looking for some tracker that doesn't need a sim card, just a locator using gps locator but I also don't have any IMEI number or even email. So please help me, is there any way to find my lost Samsung Galaxy Ace 55830?

*file:///wexdata/check/short_android.json?converter-id=19&413*

Possible Duplicate: An app to locate my Android device around the house? I'm looking for a "find my phone" app that can be activated from another app instead of a webpage. The scenario is simple, my wife misplaces her android phone frequently. I'd like to be able to quickly launch an app from my android phone or tablet and activate a find me siren on her device.

*file:///wexdata/check/short_android.json?converter-id=19&1043*

Why is Google Play Music constantly running on my galaxy s4? I don't use any music app.

FIG. 4

Current search context

Query: Android AND find

Current search context

Oftentimes I don't know where I placed my [Android]. What app would you recommend to allow me to send an email that will cause [vibrate] and emit high volume [sounds]/music that will help me [find] it?

Similar Document Rank 1
I just [lost] my phone today and I don't have any [Find Me] [app] but I am logged in with all of my information. Like my email, facebook. and such things. How can I possibly [find] it? I also know that my GPS is set [On].

Similar Document Rank 2
3 weeks ago I lost my Samsung Galaxy Ace. I don't have any tracker applications or any "if lost" applications installed. I'm looking for some [tracker] that doesn't need a [sim card] just a [locator] using [gps locator] but I also don't have any IMEI number or even email. So please help me, is there any way to [find] my [lost] Samsung Galaxy Ace 55830?

Similar Document Rank 3
Possible [Duplicate]: An app to locate my Android device around the house? I'm looking for a [find] my phone " [app] that can be activated from another app instead of a webpage. The scenario is simple, my wife misplaces her android phone frequently. I'd like to be able to [quickly] launch an app from my android phone of [tablet] and activate a find me [siren] on her device.

Similar Document Rank 4
Why is [Google Play Music] constantly running on my galaxy s4? I don't use any music app.

FIG. 10

POSITIVE/NEGATIVE FACET IDENTIFICATION IN SIMILAR DOCUMENTS TO SEARCH CONTEXT

BACKGROUND

The present invention relates generally to the field of document queries, and more particularly, to facet-based query result analysis and presentation. Facet-based text mining is one solution for text mining large volumes of unstructured data. A "facet" is an information entity associated with informational elements, often referred to as "documents". Text mining is a technology for acquiring knowledge from a large amount of unstructured data of documents, without necessarily reading the entire content of the documents. In operation, a text mining system or component analyzes the unstructured text data of a whole document set, and extract facets.

Facets and facet values can be generated as a result of a natural language processing (NLP) pipeline, in which annotator software detects conditions and adds facets. With respect to documents, the NLP processes the documents, looking into them for facet values or features. For instance, facets might be categories for categorizing products in the e-commerce space. Natural language processing might assign categories, of varying granularities, to documents, for instance, identifying specific words or phrases included in the documents, creation date(s), or timeframes for the documents or items they represent, or categories directed to the sentiment, tone or expression of the documents or items they represent, as examples. Facets can be aggregated (when searching) to understand corpus characteristics. Aggregating facets refers to adding conditions, for instance, query constraints when searching a document set. A system or user can specify a document subset, perhaps via a query, then among that document subset, software can sort, rank, and perform other processing on the categories.

SUMMARY

Shortcomings of the prior art are overcome and additional advantages are provided through the provision of a computer-implemented method which includes receiving a query search context for querying documents of a document set, and retrieving, by similar document search processing, a document subset of the document set. The document subset includes documents of the document set most similar to a search document of the query search context. The method further includes: generating, via facet analysis processing, M candidate facets most-related to the query search context; identifying facets of the M candidate facets associated with the documents of the document subset; classifying identified facets associated with the documents of the document subset into a positive facet set and a negative facet set based, at least in part, on extent of facet commonality across the documents of the document subset; and providing, at least in part, a listing of the documents of the document subset. The listing includes a highlighting of facets of the positive facet set in the documents of the document subset.

Computer systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts a computing system display illustrating search results for sample documents identified by one embodiment of artificial intelligence-based text mining and document ranking technologies;

FIG. 4 is a computer system display illustrating the document search results of FIG. 2, with sets of facets identified using an approach such as depicted in FIG. 3 highlighted;

FIG. 10 depicts the search result example of FIGS. 2 & 4, with facets of a positive facet set and facets of a negative facet set differently identified, in accordance with one or more aspects of the present invention;

DETAILED DESCRIPTION

Figure 1:
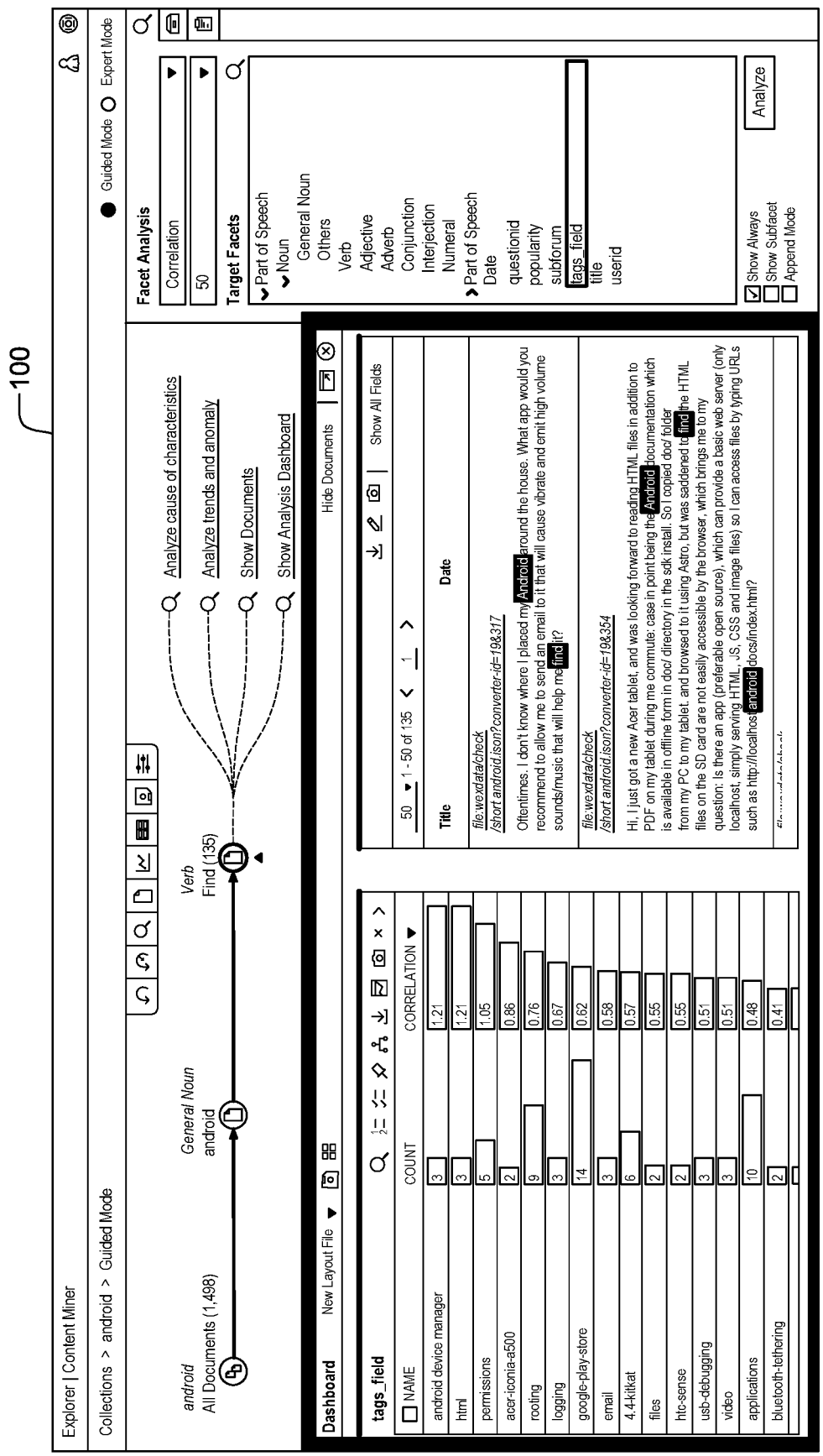
FIG. 1 depicts a computing system display illustrating one embodiment of a user interface associated with an artificial intelligence-based, similar document identification search engine.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of positive/negative facet analysis processing and highlighting, as disclosed herein.

Throughout this description, the terms component, engine, and facility are used interchangeably to refer to certain aspects of the present invention that perform various operations, functions, and the like. As the terms are used herein, component, engine, and facility can be an implementation of the functions or aspects of the illustrative embodiments in the form of an apparatus, a procedure, or a computer program product. In the case of a procedure, the procedure is implemented by one or more devices, apparatuses, computers, data processing systems, or the like. In the case of a computer program product, the logic represented by computer code or instructions embodied in or on the computer program product is executed by one or more hardware devices in order to implement the functionality or perform the operations associated with the specific component, engine, or facility. Thus, the components described herein can be implemented as specialized hardware, software executing on general purpose hardware, software instructions stored on a medium such that the instructions are readily executable by specialized or general purpose hardware, a procedure or method for executing the functions, or a combination of any of the above.

The present invention relates generally to an enhanced data processing system and method, and more particularly, to mechanisms for statistical analysis of documents retrieved via facet-based text mining. Facet-based text mining is one solution for text mining large volumes of unstructured data. As noted, a "facet" is an information entity associated with information elements, sometimes referred to as "documents". Facets and facet values can be generated as a result of a natural language processing (NLP) pipeline, in which annotator software detects conditions and adds facets. With respect to the documents, the NPL processes the documents, looking into the documents for these facets, facet values, or features. For instance, facets might be categories for categorizing products in an e-commerce space. Natural language processing might assign categories of, varying granularity, to documents, for instance, identifying specific words or phrases included in the documents, creation date(s), or time frames for the documents or items may represent, or categories directed to the sentiment, tone or expression of the documents or items they represent, as examples. Facets can be aggregated (for instance, with searching) to understand corpus characteristics. Aggregating facets refers to adding conditions, for instance, query constraints when searching a document set. The user (e.g., a requester or a requesting system) can specify a document subset, via a search context and/or search query, then among that document subset, software can sort, rank, and perform other processing.

More particularly, a facet is an informational entity associated with or included in a document (informational element), and that projects or represents a characteristic(s) of the document. Documents can be classified across multiple facets according to a classification system enabling faceted searching, navigation, and browsing. The term "documents" is used herein to refer to informational entities, or units of mining, however, it is understood that each "document" can be produced from any type of data. The word "document" is not to be construed strictly as, for example, a digital document of word processing software (though such files could be an example of a "document" as used herein). Documents, in the informational element sense, could refer to images, for example. In the e-commerce and product space, one database record could be a "document" as used herein. Document databases have an almost infinitely flexible structure that provides a number of different key areas of functionality, for instance, they may be schema-less-document databases that do not have to predefine the structure of the data that might be stored in the database. Document databases can store any information. A widely used structural format is JSON, an object notation format from the JavaScript® language, allowing one to store strings, numbers, arrays, and record (hash) data, and combinations of those core types. JavaScript is a registered trademark of Oracle Corporation and/or its affiliates.

A value for a facet might be stored in metadata of or associated with the document. An example of such metadata might be simple characteristics of a document, such as a location (state, province), nouns, adjectives, or key words associated with the document, or more complex characteristics, for instance, impressions conveyed by the document. A procedure of facet-based text mining is to repeat facet aggregation, browse facets, and refine the initial "document subset", which is a collection of documents that represent specified facet values, into a refined document subset. Facet aggregation can refer to grouping into a document subset all of the resulting documents that fit a query, counting the facet values associated with the document subset, and computing frequency, correlation, and/or a timeline analysis (as examples) for the document subset. In document subset refinement, consideration of the facet aggregation can lead to an extraction of a refined document subset. As a result of repeated aggregation and refinement, knowledge can be obtained and new findings discovered.

By way of example, FIG. 1 depicts one embodiment of a computing system display 100 (or display screen) illustrating a user interface for an artificial intelligence-based content miner, such as the IBM® Watson® Explorer content miner. IBM and Watson are registered trademarks of International Business Machines Corporation, Armonk, N.Y. Other names used herein may be registered trademarks, trademarks, or product names of International Business Machines Corporation, or other companies.

A content miner is a computer-implemented text mining facility or engine that utilizes words, phrases, and linguistic or other domain-specific annotations for consideration as significant from a statistical point of view, to analyze large amounts of unstructured documents, without investigating the entire content of all the documents. The content miner is assumed to include the concept of document sets or a collection of documents, and facets, as described herein. As noted, facets or facet groups can be words, phrases and/or annotations that share a concept. A facet value is a word, phrase or an annotation, such as a characteristic of a document. A content minor or text mining facility or engine can, in one or more embodiments, execute on (or utilize) two or more computing components including, for instance, a back-end computing system or environment, and a front-end computing system or environment. In one or more embodiments, the back-end computing system is configured or programmed to determine the statistical information (at least correlation) of facet values in a specific document set, and refines the document set by a query condition that includes, for instance, selected facet values. The front-end system displays, for example, a snippet of the text of one or more documents that contain a selected facet value. A user can browse facet values which the user is interested in, and use them to refine the current document subset, and show documents containing the selected facet values. Interesting words, phrases and annotations can be found using facet analysis features, as illustrated, by way of example, in FIG. 1.

For instance, a process can accept a search context or query string to query documents of a whole document set, where the documents of the whole document set deviate by one or more facet values. Execution of a search context can obtain a resulting document subset. A "resulting document subset" is the set of documents returned as a result of executing the search context. Thus, for each different search context, the facet-based text mining system can obtain a resulting document subset, from the whole document set (i.e., a sub-set of the whole), corresponding to that search context. The processing can identify facet values represented in the resulting document subset.

Along with making a first-pass search of a given query string or search context, a similar document ranking system or technology is utilized. The similar document ranker uses a ranking model typically acquired by machine learning for re-ranking a first-pass search result in order of similarity to the query text. Such similar document ranking will identify documents that are more likely to contain information that the user wants to retrieve. In particular, a ranking facility defines documents in a search result through the use of learning-to-rank algorithms, which are a form of machine learning. Document ranking requires training data to learn where documents should be placed in the search result. A ranker with a trained model can be deployed as a ranker instance, and the deployed ranker instance can be associated with one or more whole document sets, or document set collections, to modify the search results. One type of ranker is referred to as a similar document ranker. A similar document ranker accepts a search document as a search query, and returns a list of identified documents ranked by their expected similarities to the queried search document. This similar document ranker, or ranking, thus identifies documents that are more likely to contain information that the user wishes to find out, which is the general purpose of similar document ranking technology.

With existing text mining facilities or technologies, and similar document ranking facilities, effort is required by the user to determine what makes each document similar to the search document, and to determine what makes each document different from the search document. For instance, FIG. 2 depicts computing system display 100 illustrating sample results of a similar document search using existing text mining and document ranking facilities. The example assumes that the facilities have performed a first-pass search result determination and a second-pass re-ranking of the search results to identify and rank the most applicable documents to the search context. As illustrated in FIG. 2, a user would see the following points if they read the search document and re-ranked documents. The search document 200 is questioning if there is an app to make a lost phone take action to give a hint of its location. The first re-ranked document 201 is questioning if there is a way to find the lost phone who's GPS is available. The second re-ranked document 202 is questioning if there is a tracker to identify a lost phone without GPS. The third re-ranked document 203 is questioning if there is an app to make a lost phone take action to give a hint of its location. In each case, the topics of the identified documents are about locating a lost phone, but there are differences in how to find the phone. The user thus needs to look through a number of document summaries to check points that make them similar, and points that make the documents different from each other.

To address this, disclosed herein are facet-based processes to detect similarity and differences in ranked documents of a document subset determined for a search context utilizing text analytics and statistical analytics facilities, and to emphasize or highlight those similarities and differences when the documents are provided to or listed for the user.

Figure 3:
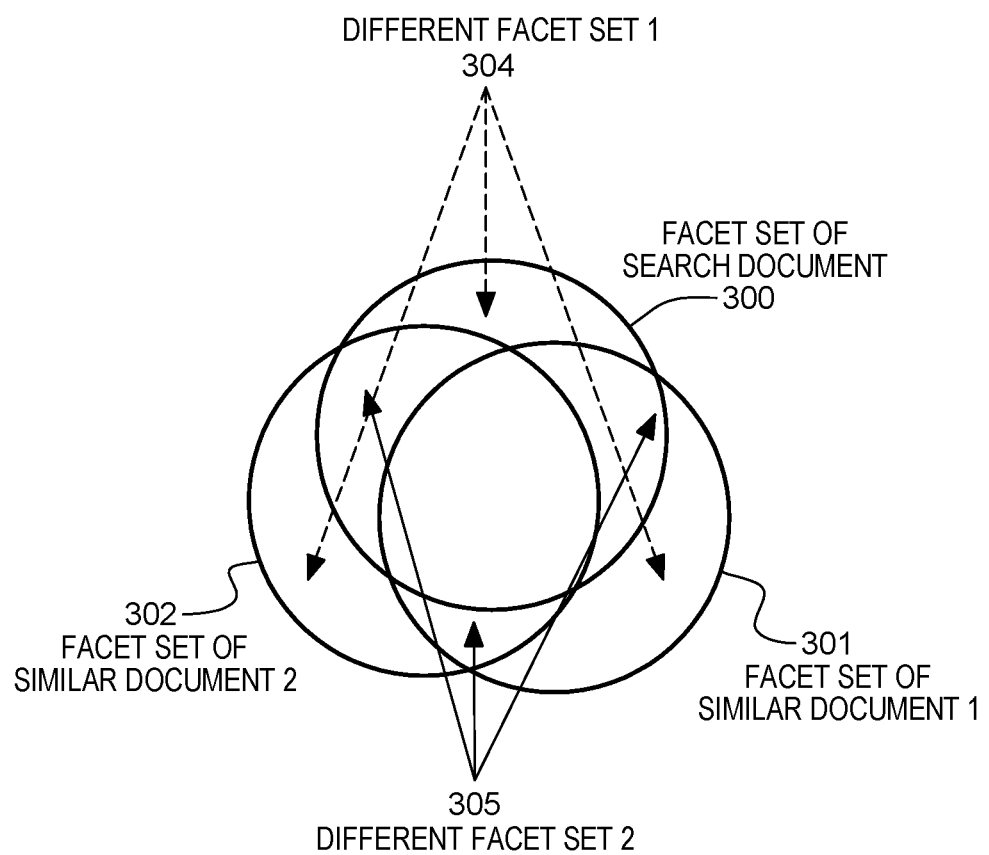
FIG. 3 graphically illustrates one embodiment of an approach for determining facet sets for a user-provided search document and identified similar documents of a searched document set.

Those skilled in the art will note that there are various existing technologies, facilities, etc., for extracting characteristic facets. Using these technologies, one or more facets that are characteristic to the search document and an identified similar document subset can be extracted. Such facets are referred to herein as positive facets. By way of example, FIG. 3 depicts overlap of a facet set of a search document 301, a facet set of a similar document 1 301, and a facet set of a similar document 2 302, illustrating existence of one or more positive facets. Also, a facet set that indicates differences can be identified. As illustrated in FIG. 3, exclusive sets of facets of a search document and the similar documents in the document subset can be identified, with the different facet sets 304, 305 being selectable. This aspect is similar to the way that processing can perform clustering against similar documents in a document subset, making a "diff". However, with such an approach, the context of the search will not be well incorporated. Since the facets that will be used in the documents range widely, it is very likely that noisy facets will be picked up that do not reflect the current search context. The same result can happen in extracting positive facets, but is more noticeable in extracting negative facets.

FIG. 4 is an illustration of this, where facets are highlighted, depicting a number of noisy facets that appear only in each similar document, but have little relevance to the search context, such as finding the lost phone. In this case, the user is required to spend time going through the highlighted facets to identify the point of a particular document, and to determine that similar document 203 is most on-point to the search context 200. To restate, the difficulty with such an approach is that the user is required to evaluate a number of similar documents of the presented document subset to, for instance, identify what makes a particular document similar to the search document, and what makes the particular document different from the search document. Further, these issues cannot be resolved by simply making a "diff", since the user will likely face a significant number of noisy facets that do not reflect the current search context, as illustrated above in the user interface example of FIG. 4.

Generally stated, disclosed herein are enhancements to existing similar document search and facet analysis facilities to include, for instance, a facet analysis facility or component that extracts candidate facet values of positive and/or negative facets via a set operation. For instance, the facility can determine if each candidate facet value is essential to a user's current search context using statistical information, such as correlation. This can be performed, for instance, by a statistical analysis engine such as described below with reference to the implementation of FIG. 8. In addition, a similar document analysis user interface is provided, for instance, at a front-end computing system, that provides or emphasizes the facet set(s) in the search document and its' identified similar documents by highlighting, for instance, positive facets and negative facets, differently, such as by indicating or highlighting the positive facets and the negative facets using different colors and/or different line patterns, different shading, etc.

Figure 11:
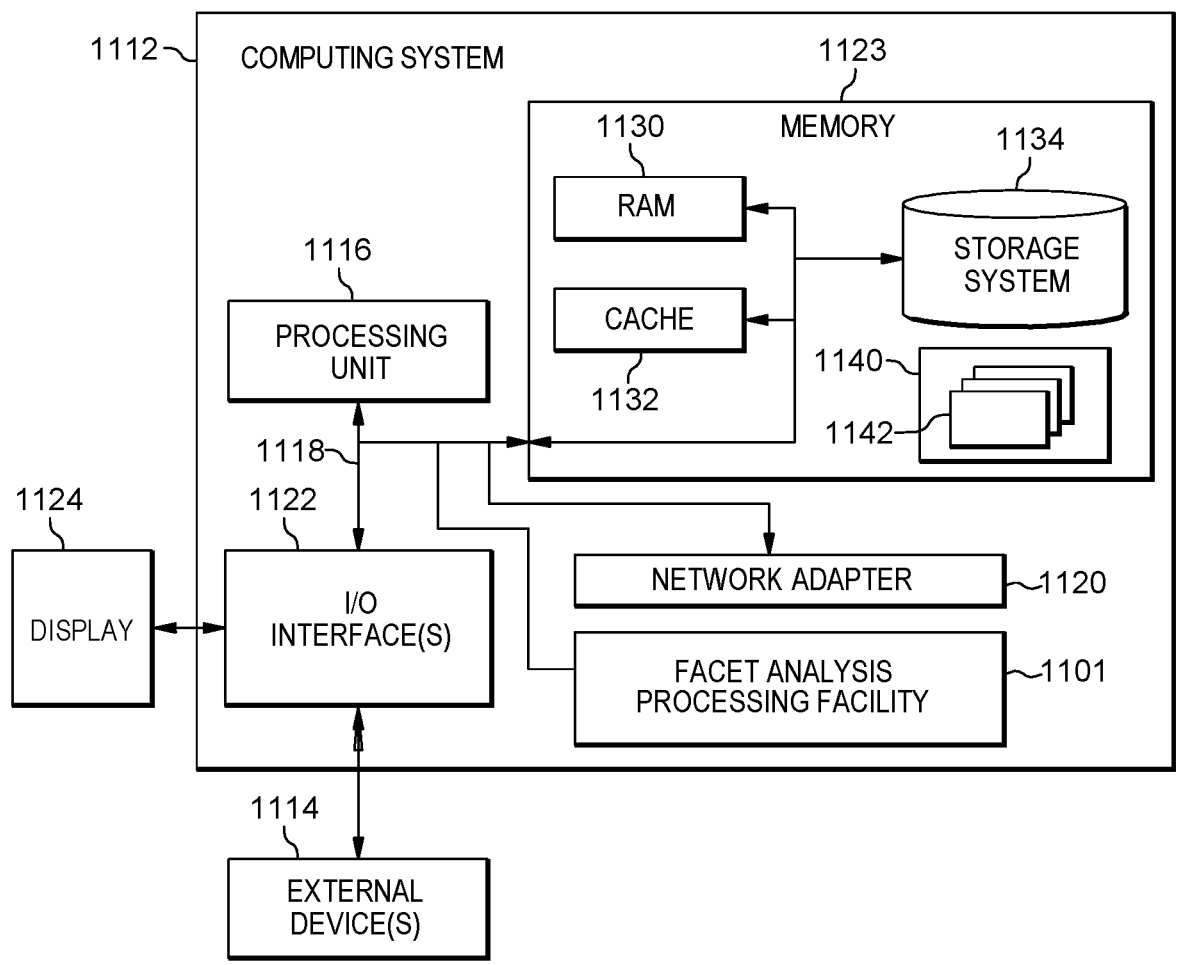
FIG. 11 depicts one embodiment of a computing system which can implement or facilitate implementing positive/negative facet analysis processing, in accordance with one or more aspects of the present invention.

As understood by one skilled in the art, code or program code, as referred to throughout this application, can include both software and hardware. For example, program code, in certain embodiments of the present invention, includes fixed-function hardware, while other embodiments can utilize a software-based implementation of the functionality described. Certain embodiments combine both types of program code. One example of program code, also referred to as one or more programs, is depicted in FIG. 11 as program/utility 1140, having a set (at least one) of program modules 1142, which can be stored in memory 1123.

Embodiments of the present invention include a computer-implemented method, a computer system, and/or a computer program product, where program code executing on one or more computing resources provides facet analysis processing and user interface processing, as noted. Embodiments of the present invention can include program code that receives a query search context for querying documents of a document set, and that retrieves, via similar document search processing, a document subset of the document set. The document subset includes documents of the document set most similar to a search document of the query search context. Further, program code generates, via facet analysis processing, M candidate facets most-related to the query search context (where M is typically >1), and identifies one or more facets of the M candidate facets associated with the documents of the document subset. Further, program code classifies identified facets associated with documents of the document subset into a positive facet set and a negative facet set based, at least in part, on extent of facet commonality across the documents of the document subset, and provides, at least in part, a listing of the documents of the document subset to a user. The listing highlights facets of the positive facet set in the documents of the document subset.

In one or more embodiments, the program code providing the listing of the documents further provides, at least in part, a different highlighting of facets of the negative facet set in the documents of the document subset than the highlighting of the facets of the positive facet set in the documents of the document subset.

In one or more implementations, the program code executing on the one or more computing resources further identifies one or more facets of the M candidate facets associated with the search document of the query search context, and the classifying includes classifying identified facets into the positive facet set and the negative facet set based on extent of facet commonality across the search document and the documents of the document subset.

In one or more embodiments, the classifying includes classifying a facet of the identified facets into the positive facet set where the facet is associated with the search document and associated with one or more documents of the document subset, and classifying a facet of the identified facets into the negative facet set where the facet is only associated with the search document, or only associated with a document of the document subset.

In one or more embodiments, the providing includes displaying, at least in part, the documents of the document subset on a display for a user, and the highlighting includes highlighting on the display facets of the positive facet set associated with the documents of document subset, and differently highlighting on the display facets of the negative facet set associated with the documents of the document subset.

In one or more implementations, the listing displayed includes a highlighting of facets of the positive facet set associated with documents of the document subset using a first color, and a highlighting of facets of the negative facet set associated with the documents of the document subset using a second color.

In one or more implementations, the identifying of the one or more facets of the M candidate facets associated with the documents of the document subset includes identifying, for each document of the document subset, any facets of the M candidate facets associated with that document, and producing an associated facet set for each document of the document subset, each associated facet set containing any facets of the M candidate facets generated as most-related to the search context, where the classifying includes using the associated facet sets of the documents of the document subset in determining the extent of facet commonality across the documents of the document sub set.

In one or more embodiments, the query search context is received from a user, and the providing includes presenting to the user, at least in part, the listing of the documents of the document subset in ranked order of similarity to the search document of the query search context, along with the highlighting of facets of the positive facet set in the documents.

In one or more embodiments, the search document is a natural language search document, and the documents of the document set are natural language documents.

Figure 5:
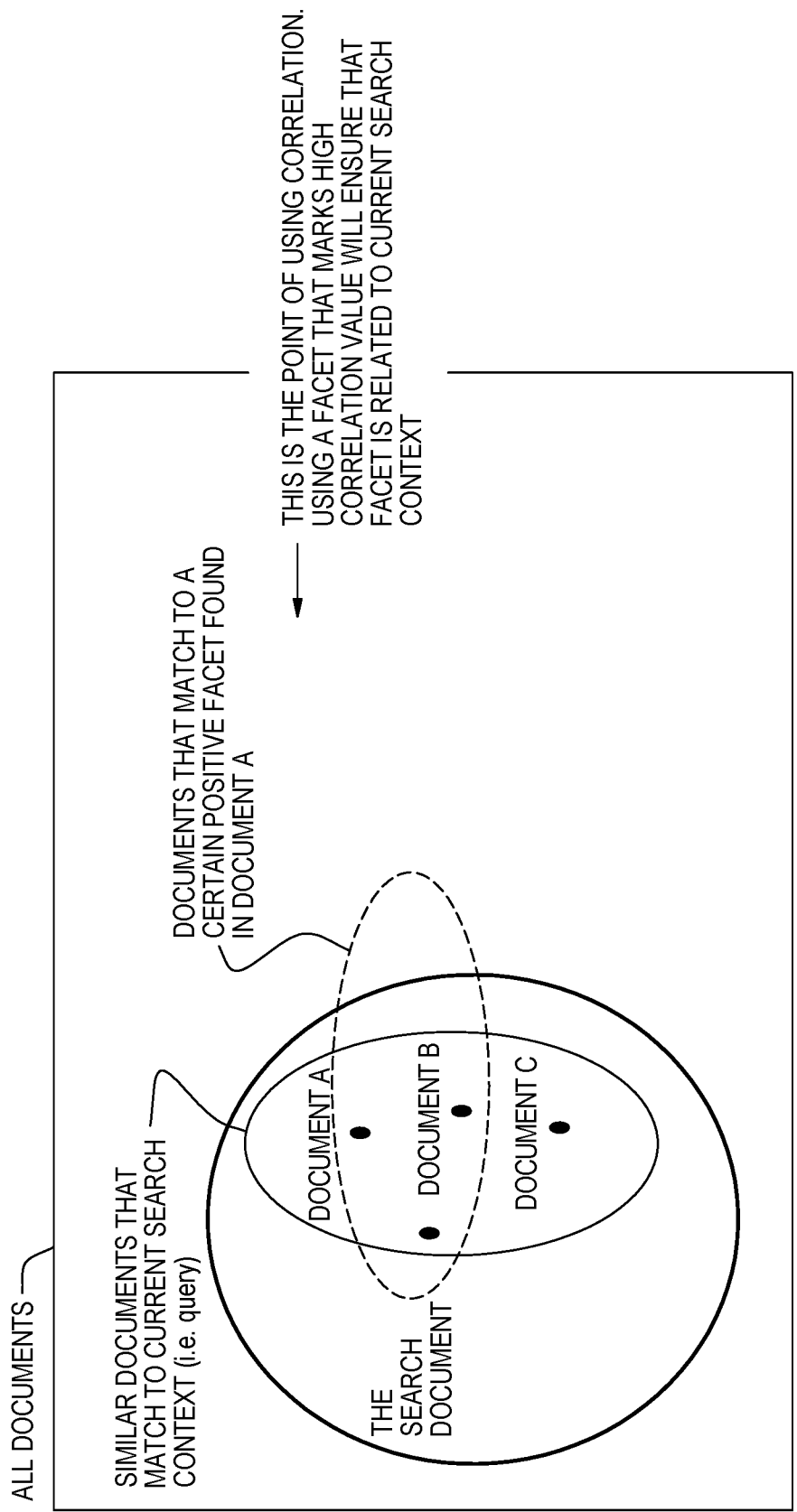
FIG. 5 graphically represents using correlation analysis to ensure that a facet is positively related to a current search context, in accordance with one or more aspects of the present invention.

By way of example, FIG. 5 graphically depicts identifying documents that match to a certain positive facet found in a document A. The goal is to classify a facet as positive or negative if the facet of a candidate facet set is essential to the current search context. There are a number of approaches to accomplishing this, with correlation processing being one approach. In FIG. 5, a whole document set is represented, along with a search document shown superimposed. Based on similar document search processing, multiple similar documents that match the current search context, including document A, document B, and document C, are identified. Further, documents that match to a certain positive facet found in document A are also encircled, which is the point of using correlation. Identifying a facet that has a high correlation value will ensure that the facet is related to the user's current search context.

Figure 6:
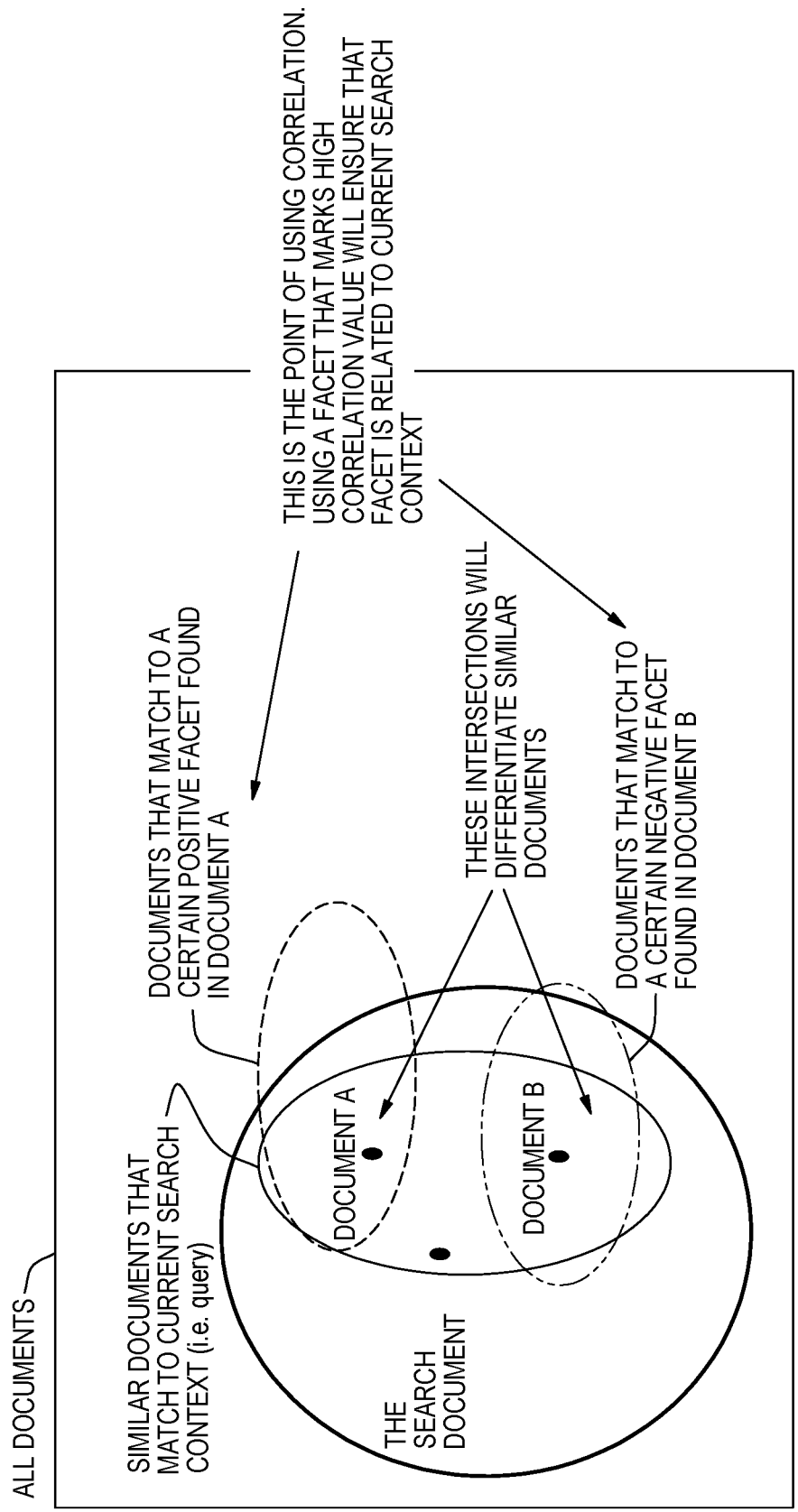
FIG. 6 graphically represents using correlation analysis to identify that a facet is negatively related to a current search context, in accordance with one or more aspects of the present invention.

FIG. 6 depicts a similar illustration as FIG. 5, and further identifying (by way of example) documents that match a negative facet. In particular, documents that match to a certain negative facet found in document B are encircled, and shown to be outside the documents that match to a positive facet found in document A. With correlation, a facet that marks high correlation value will ensure that the facet is related to the current search context, and the differences illustrated between the positive facet matches and the negative facet matches assist in differentiating between the similar documents of the document subset that match to the current search context.

Figure 7:
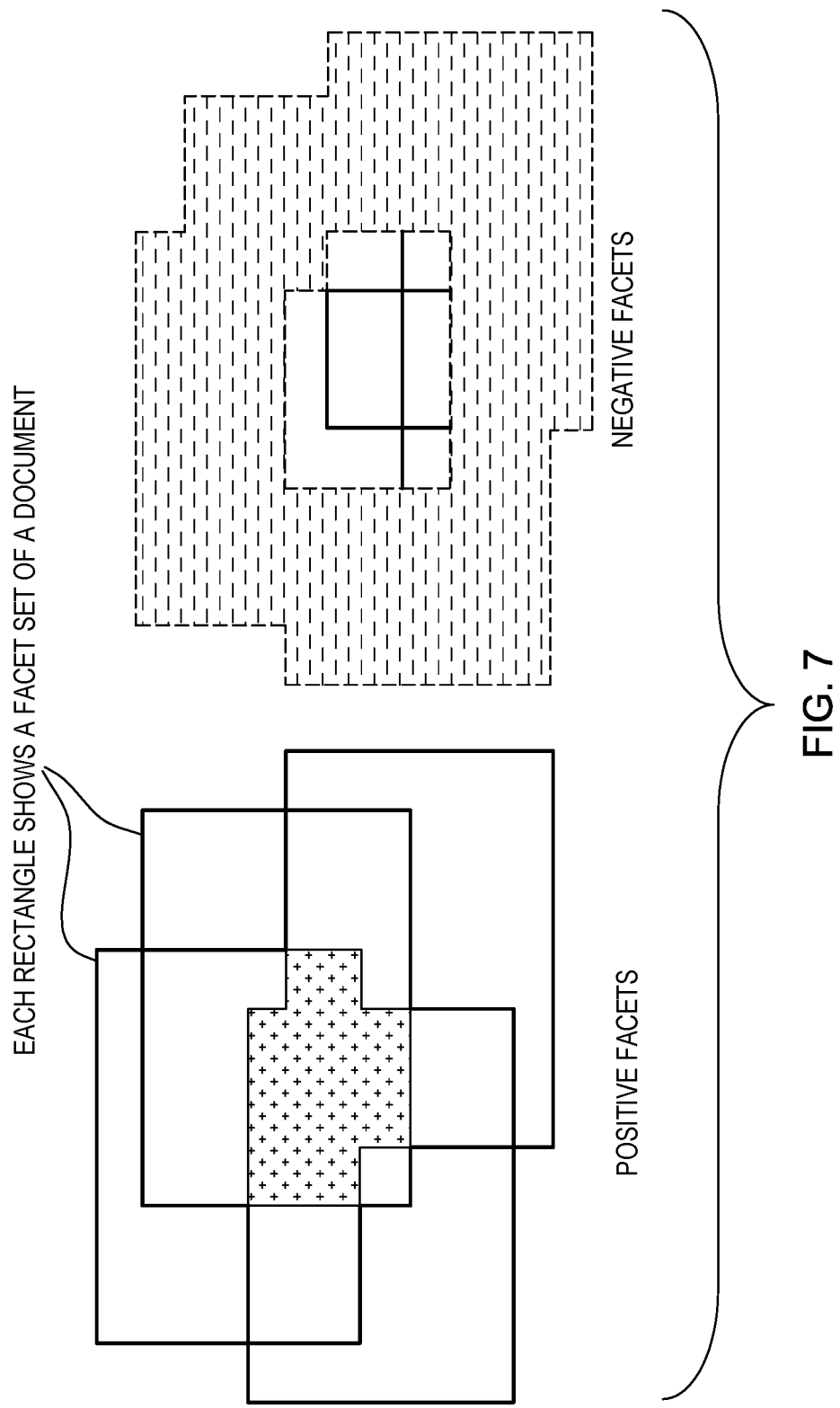
FIG. 7 graphically depicts one embodiment of classified positive facets and negative facets of facet sets of documents based on extent of commonality, in accordance with one or more aspects of the present invention.

In one or more embodiments, a correlation value can be utilized as a score of each facet in the candidate facet set. With either a threshold-based or a ranking-based approach, the facets of highest correlation value from a candidate facet set can be selected to decide whether the facet should be part of a positive facet set to be emphasized in the user interface listing the similar documents to the query search context, or not part of the positive facet set. For instance, a candidate facet set can be determined by the intersection and/or exclusion of the facet set of each document. Further, the intersection and/or exclusion analysis can be relaxed to ensure that there are a sufficient number of candidate facets to select. In the example of FIG. 7, each rectangle depicts a facet set of a document.

By way of example, the number of documents can be reduced by determining the intersection and/or exclusion one-by-one, until a sufficient number of candidate facets are gathered. For instance, assume that there are documents A, B, C and D. In the case of a positive facet set, processing determines whether an intersection of facet sets of A, B, C and D can be obtained. If there is an insufficient number of positive facets, then an intersection of facets sets of A-B-C, A-B-D, and B-C-D can be obtained. The resultant four facet sets can then be joined to obtain a candidate positive facet set. In the case where a sufficient number of positive facets cannot be obtained, then the number of documents used to calculate an intersection of facet sets can be reduced. In the case of a negative facet set, the same processing can be used as for a positive facet set, except in this process, an exclusion of facet sets is determined rather than an intersection, as in the case with the positive facet set.

In accordance with one or more aspects disclosed herein, the examples of FIGS. 5 & 6 represent sets of documents that will be matched with a query or a facet, with the similar documents encircled identifying the document subset of documents evaluated as similar to the user's submitted document. Facets that are assigned to a number of documents in the document subset represent a common characteristic of retrieved documents, which can be thought of as evidence as to why the system believes those documents are similar to the user's submitted documents. These type of facets are referred to herein as positive facets. Facets that are assigned to only one of the documents are referred to as negative facets since they differentiate from other retrieved documents, as well as the user's submitted document. In both cases, the facets are considered as special facets; that is, in a positive or negative sense, to be emphasized, identified or highlighted to the user by the user interface.

Note that a simple set operation can be utilized to make a candidate facet set. Alternatively, available text analytics and available statistical analytics technologies can be utilized, in addition to using a correlation value to limit or verify that a facet is reflecting a current search context. One or more similar document rankers can utilize these fields to determine similarity. However, a user would still need to read through all the fields to identify positive facets and negative facets, which can be time consuming and costly, depending on the number of fields, and the existence of fields, such as ID fields, that would need to be ignored for such an operation. The similar document ranker can be adjusted, in accordance with the concepts disclosed herein, to provide information about which fields contribute to scoring, so that that information can be utilized, and also can limit fields to apply the methods disclosed herein, such as to a single-text field.

As noted, the facets of the positive set and the facets of the negative facet set can be indicated or highlighted differently in a user interface of, for instance, a front-end system being used by a user. For instance, the similar document search results can be displayed, or otherwise presented, to the user with, for instance, a highlighting of facets of the positive facet set associated with the documents of the document subset using a first color, and highlighting of facets of the negative facet set associated with the documents of the document subset using a second color, where the first and second colors are different colors, or different intensities of the same color. As noted above, other approaches to differently indicating or highlighting facets of the positive facet set and facets of the negative facet set can be utilized, such as, for instance, different line patterns, different shadings, etc. Further, the text length of each retrieved similar document of the document subset can be relatively long, such that a snippet of the text around the selected facets can be supported by the facet analysis and highlighting disclosed herein. Further, since the facet analysis is based, in one or more implementations, on facet correlation values, then the selected color or other indication of the facet being in a positive facet set or a negative facet set can vary to illustrate the degree of importance determined by the correlation analysis. For instance, a positive facet that correlates 99% to the search context can be identified using a dark color highlighting, and a positive facet that, for instance, correlates 85% to the search context, might be highlighted using a lighter version of that color. Note that the identifying or highlighting can be associated with the facets in any of a wide variety of manners in order to indicate to the user whether, for instance, a particular facet is in the positive facet set or negative facet set, and/or the strength of correlation of a positive facet or negative facet to the search context.

Figure 8:
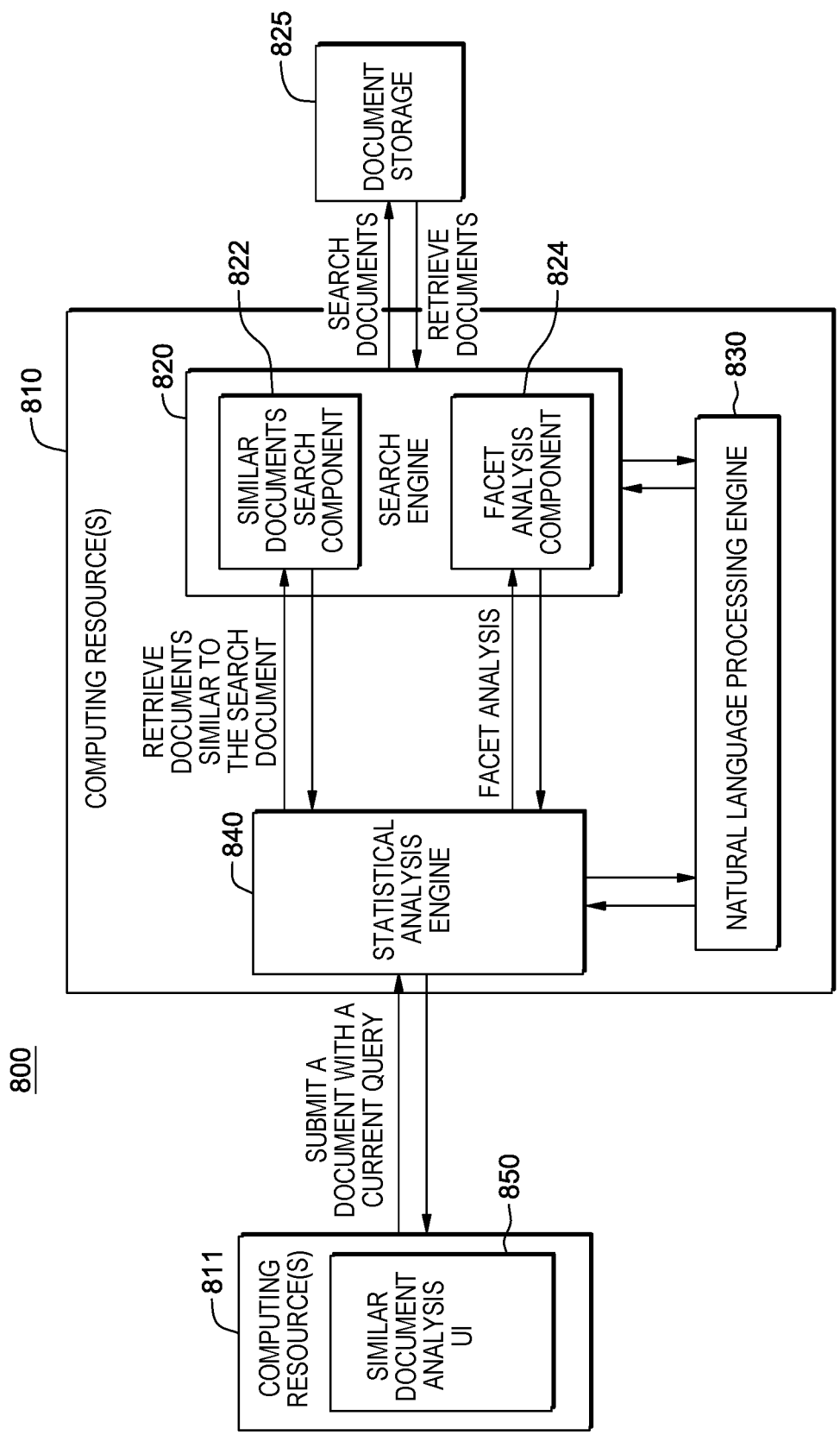
FIG. 8 is an illustration of a technical environment into which various aspects of an embodiment of positive/negative facet analysis processing and highlighting can be implemented, in accordance with one or more aspects of the present invention

FIG. 8 depicts one embodiment of a technical environment 800 into which various aspects of some embodiments of the present invention can be implemented or integrated. Environment 800 includes computing devices, including one or more computing resources 810 that execute program code that implements a search engine 820 that searches and retrieves documents from a document storage 825. Search engine 820 can utilize, in one or more implementations, a natural language processing engine 830, and can include a similar document search component 822, and a facet analysis component 824 to, for instance, facilitate ranking of similar documents retrieved responsive to a query search context. Further, in accordance with one or more aspects disclosed herein, computing resources 810 can execute program code that implements a statistical analysis engine 840 providing facet analysis processing, such as disclosed herein. As illustrated, in one or more embodiments, statistical analysis engine 840 can interface with similar document search component 822 to, for instance, search documents similar to the query search document, and can interface with facet analysis component 824 to, for instance, provide positive/negative facet analysis, as described herein. In one or more implementations, computing resource(s) 810 can represent or be implemented on a back-end computing system or environment, and can receive a query search context, including a search document, from the user using a similar document analysis user-interface 850 executing on a separate computing resource(s) 811 from the one or more computing resources 810 that execute program code implementing search engine 820, natural language processing engine 830, and statistical analysis engine 840. Note that this is a non-limiting example of an implementation, and that the similar document analysis user-interface 850 can share a computing resource of the computing resources 810. For instance, various modules of the program code can be executed on various resources in various embodiments of the present invention, and thus, search engine 820, natural language processing engine 830, and statistical analysis engine 840 could be separate components or facilities housed on or executed within computing resource(s) 810.

In one embodiment, one or more of search engine 820, natural language processing engine 830, and statistical analysis engine 840 can be artificial intelligence-based engines or facilities, one or more of which can include a model, based on machine learning (e.g., via a cognitive and/or learning agent). In operation, statistical analysis engine 840 provides a query to similar document search component 822 to retrieve similar documents that match to a received current search context. In one or more embodiments, similar document search component 822 is an artificial intelligence-based, similar document ranker. As noted, such a ranker defines documents in a search result through the use of learning-to-rank algorithms, which are a form of machine learning. Document ranking requires training data to learn where a document should be placed in the search result. A ranker with a trained model can be deployed as a ranker instance, and the deployed ranker instance can be associated with one or more document collections to modify the results. A similar document ranker is one type of ranker that can be created. A similar document ranker accepts a document as a search query and returns a list of documents ranked by their expected similarities to the queried document. The above-referenced IBM Watson® Explorer facility is one example of an artificial intelligence-based technology which supports creation of such a similar document search component.

In one implementation, facet analysis component 824 can be, for instance, the above-referenced IBM Watson® Explorer content miner, which facilitates analyzing a collection or subset of similar documents to the query search context. Natural language processing engine 830 supports search engine 820, including similar document search component 822 and facet analysis component 824, and is, in one or more implementations, an artificial intelligence-based facility that, for instance, applies algorithms to identify and extract natural language rules such that unstructured language data can be converted into a form that can be processed by the computing environment. In one or more embodiments, certain of the APIs of the IBM Watson® API include a cognitive agent that includes one or more programs including, but not limited to, natural language processing, natural language classifiers, Retrieve and Rank (a service available through the IBM Watson® Developer Cloud that can surface the most-relevant information), concepts/visual insights, trade-off analytics, text conversion, and/or relationship extraction. Note that various other APIs and third party solutions can provide certain of the above-noted existing functionality discussed herein.

Statistical analysis engine 840, and similar document analysis user-interface 850 are, in one or more embodiments, facilities which implement or integrate positive/negative facet analysis processing such as disclosed herein. As noted, in one embodiment, statistical analysis engine 840 can be based on machine learning. Machine learning (ML) solves problems that cannot be solved by numerical means alone. In a machine learning-based implementation, program code extracts various features/attributes from training data (e.g., data collected from various data sources relevant to the analysis process), which can be resident in one or more databases. The features are utilized to develop a predictor function, also referred to as a hypothesis, which the program code utilizes as a machine learning model. In identifying positive and/or negative facets to a query search context, program code can utilize various techniques to select features (elements, patterns, attributes, etc.) including, but not limited to, diffusion mapping, principle component analysis, recursive feature elimination (a brute force approach to selecting features), and/or a random forest to select, for instance, facets most-related to the search context. The program code can utilize a machine learning algorithm to train the machine learning model (e.g., the algorithms utilized by the program code), including providing rankings for facets, so that the program code can train the predictor or recommendation functions to include the machine learning model. The conclusions can be evaluated by a quality metric. By selecting an appropriate set of training data, program code trains the machine learning model to identify, for instance, both positive facets highly correlated to a query search context, and negative facets not particularly correlated to the query search context.

Figure 9:
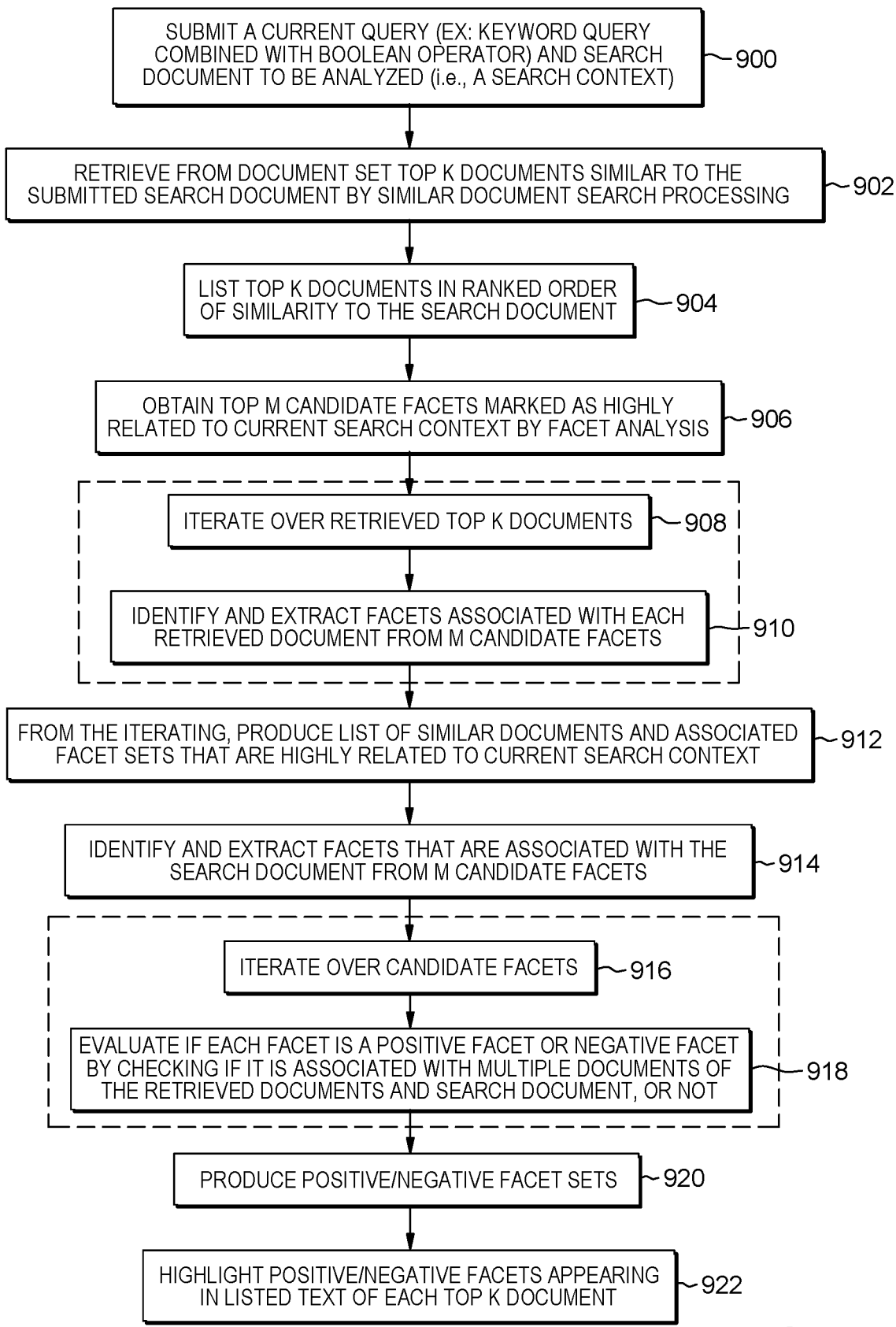
FIG. 9 depicts one embodiment of positive/negative facet analysis processing and highlighting, in accordance with one or more aspects of the present invention.

FIG. 9 depicts one embodiment of document search and facet analysis process, in accordance with one or more aspects of the present invention. Referring collectively to FIGS. 8 & 9, in one implementation, a user submits a current query (such as a key word query combined with a Boolean operator) and a search document that the user wishes to analyze 900. For instance, the user submits, via a similar document analysis user interface, the query search context. The statistical analysis engine receives the query search context and forwards the request to the similar document search component of the search engine to retrieve from document storage the top K documents similar to the submitted search document using similar document search processing 902, where K is typically >1. The similar document search component returns to the statistical analysis engine the top K documents in the order of similarity to the search document 904. The statistical analysis engine obtains the top M candidate facets marked as highly-related to the current search context by facet analysis processing of the facet analysis component 906. For instance, a facet analysis component can determine a type of information gain (for instance, in IBM Watson® Explorer, the terminology of correlation is used) of each facet against the current search context. There are various methods for determining this gain, such as calculating from the number of similar documents. The higher the gain, the more highly-related to the current search context the facet can be considered. The statistical analysis engine retrieves similar documents that match to the current search context and facet. After retrieving the similar documents for each facet, the statistical analysis engine makes a group of facets for each document by iterating over the retrieved top K documents 908, and identifying extracted facets that are associated with each retrieved document from the M candidate facets 910. Note in this regard that the M candidate facets have already been extracted for the retrieved documents. From the iterating and identifying, a list is produced of similar documents and associated facet sets that are highly-related to the current search context 912. Facets of the M candidate facets that are associated with the search document are identified and extracted using, for instance, the natural language processing engine and the statistical analysis engine 914. The natural language processing engine facilitates extracting the facets from the submitted document, where it is assumed that the documents are written in natural language. The statistical analysis engine includes processing for matching the extracted facets with the M (pre-collected) candidate facets. The statistical analysis engine then iterates over the candidate facets to evaluate whether each facet is positive or negative by checking if it is associated with multiple documents of the retrieved similar documents of the document subset, and the submitted search document of the query search context 916, 918, as described herein. The result produces positive and negative facet sets 920, which can then be used to differently highlight positive and negative facets on the user-interface 850 in the listed text(s) or snippet(s) from the top K documents 922.

An example of this is depicted in FIG. 10, where the example search results of FIGS. 2 & 4 is repeated, and facets of the positive facet set are shown highlighted differently from the facets of the negative facet set. With this display, the user is able to quickly identify similar document rank 3 as being particularly relevant to the query search context.

Those skilled in the art will note from the discussion provided herein that one or more aspects disclosed relate to finding essential similarities and differences of similar documents. The processing includes, for instance, discovering positive facets and negative facets from documents similar to a search document using, in part, text mining technology and similar document ranking technology. Positive and/or negative facets can be ascertained by extracting candidate facet values of a positive or negative facet, determining facet values that are essential to a user's query search context using, for instance, statistical information including correlation, and then displaying or presenting the text of the similar documents, while indicating the positive and negative facets with different attributes.

Advantageously, disclosed herein are enhancements to existing similar document search and facet analysis facilities which include, for instance, providing a facet analysis facility or component that extracts candidate facet values of positive and/or negative facets via a set operation, and providing a user interface which highlights in the identified similar documents positive facets and negative facets differently, such as by indicating or highlighting positive and negative facets using different colors, different line patterns, different shading, etc. In this manner, a user is able to verify more readily, for instance, the behavior of a similar document search. Further, the user is able to more easily detect documents whose similarity should be scored higher or lower. This will advantageously allow for a feedback loop to train the similar document ranker, because the user can raise priority of such documents as training data of the machine learning model for a similar document ranker. For instance, documents which have a large number of highlighted positive facets should be rated more similar, and if such documents are not evaluated as high as higher-ranked similar documents to the user-submitted document, then the ranker model can be retrained. Further, using the concepts disclosed herein, a user is able to more readily find facets that will show some characteristic of a document. Further, a user can make a "diff" between documents without facet noise.

Further exemplary embodiments of a computing environment to implement one or more aspects of the present invention are described below with reference to FIGS. 11-13.

By way of further example, FIG. 11 depicts one embodiment of a computing environment 1100, which includes a computing system 1112. Examples of well-known computing systems, environments, and/or configurations that may be suitable for use with computer system 1112 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1112 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 11, computing system 1112, is shown in the form of a general-purpose computing device. The components of computing system 1112 can include, but are not limited to, one or more processors or processing units 1116, a system memory 1123, and a bus 1118 that couples various system components including system memory 1123 to processor 1116.

In one embodiment, processor 1116 may be based on the z/Architecture® offered by International Business Machines Corporation, or other architectures offered by International Business Machines Corporation or other companies.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1112 can include a variety of computer system readable media. Such media may be any available media that is accessible by computing system 1112, and it includes both volatile and non-volatile media, removable and non-removable media.

System memory 1123 can include computer system readable media in the form of volatile memory, such as random access memory (RAM) 1130 and/or cache memory 1132. Computing system 1112 can further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1118 by one or more data media interfaces. As described below, memory 1123 can include at least one program product having a set (e.g., at least one) of program modules or code that are configured to carry out the functions of embodiments of the invention.

Program/utility 1140, having a set (at least one) of program modules 1142, can be stored in memory 1132 by way of example, and not limitation, as well as an operating system, one or more application programs, other program modules, and program data. Each of the operating system, one or more application programs, other program modules, and program data or some combination thereof, can include an implementation of a networking environment. Program modules 1142 generally carry out the functions and/or methodologies of embodiments of the invention as described herein. Alternatively, a facility, module, logic, etc., 1101 can be provided within computing environment 1112 implementing positive/negative facet analysis processing, as disclosed herein.

Computing system 1112 can also communicate with one or more external devices 1114 such as a keyboard, a pointing device, a display 1124, etc.; one or more devices that enable a user to interact with computing system 1112; and/or any devices (e.g., network card, modem, etc.) that enable computing system 1112 to communicate with one or more other computing devices. Such communication can occur via Input/Output (I/O) interfaces 1122. Still yet, computing system 1112 can communicate with one or more networks such as a local area network (LAN), a general wide area network (WAN), and/or a public network (e.g., the Internet) via network adapter 1120. As depicted, network adapter 1120 communicates with the other components of computing system, 1112, via bus 1118. It should be understood that although not shown, other hardware and/or software components could be used in conjunction with computing system 1112. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 11. Computer system/server 1112 of FIG. 11 can be practiced in distributed cloud computing environments where tasks are performed by remote processing devices that are linked through a communications network. In a distributed cloud computing environment, program modules may be located in both local and remote computer system storage media including memory storage devices. Computer system/server 1112 is capable of being implemented and/or performing any of the functionality set forth hereinabove.

Figure 12:
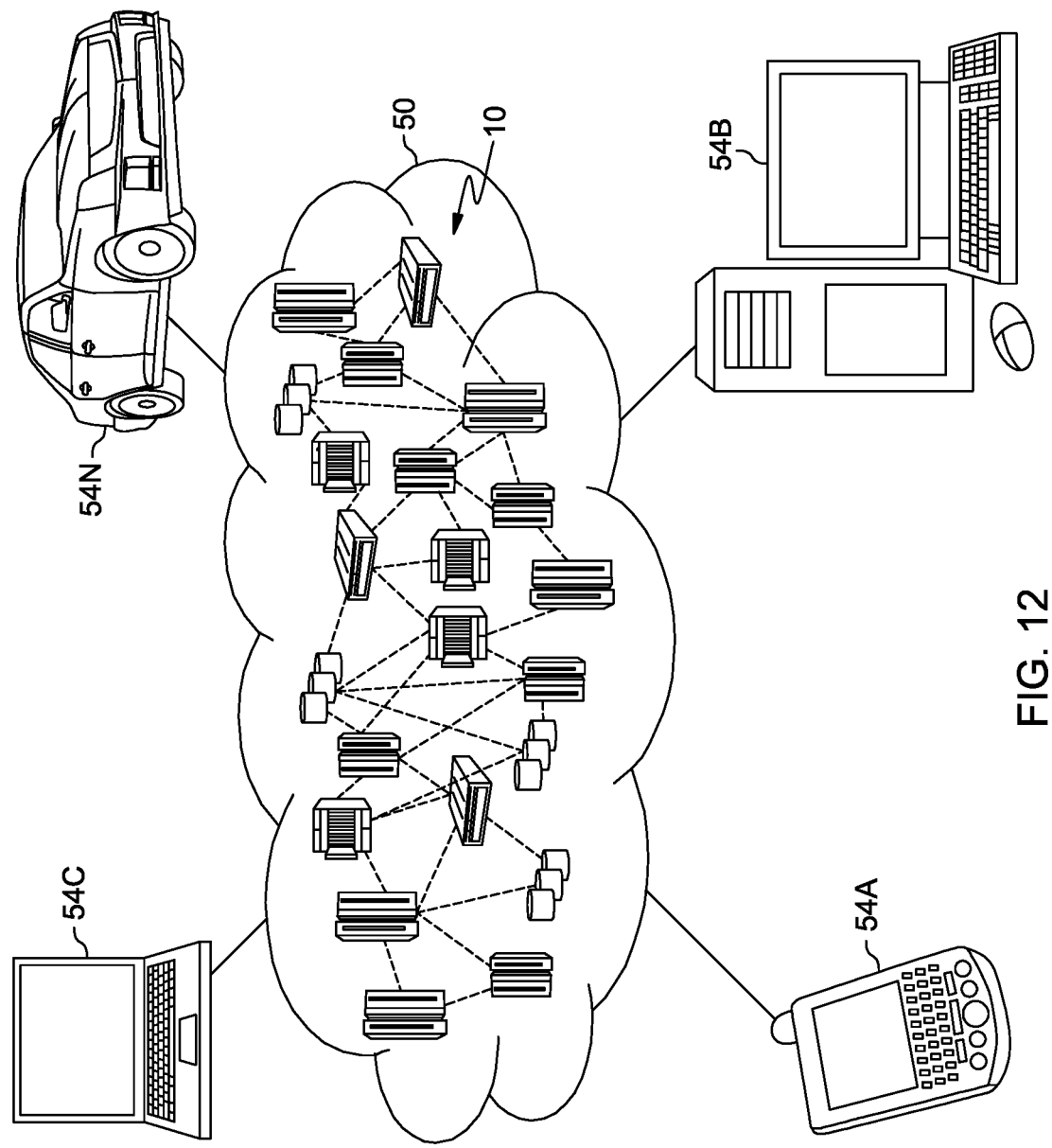
FIG. 12 depicts one embodiment of a cloud computing environment which can facilitate implementing, or be used in association with, one or more aspects of the present invention.

Referring now to FIG. 12, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 13:
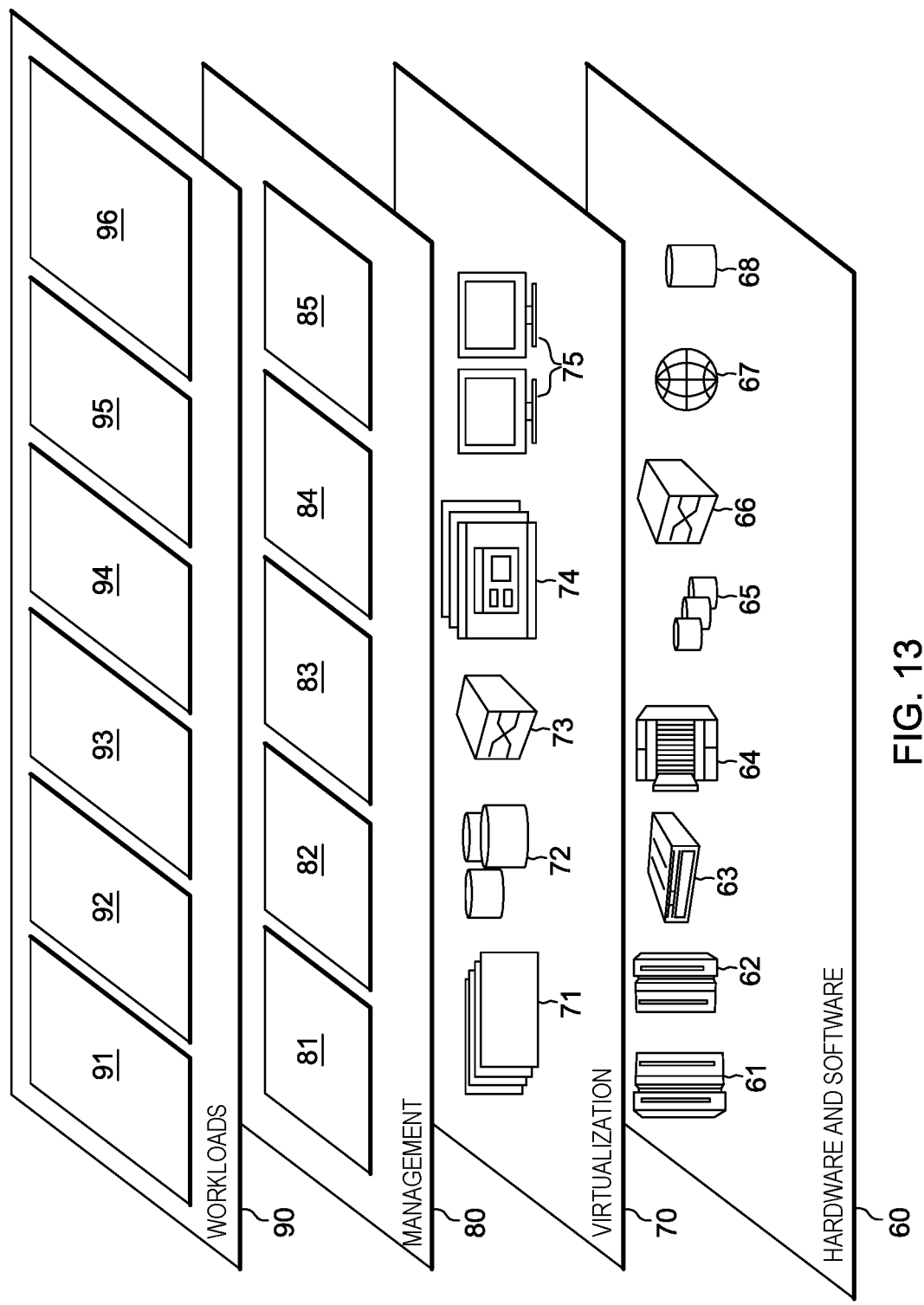
FIG. 13 depicts an example of abstraction model layers, which can facilitate implementing positive/negative facet analysis processing, in accordance with one or more aspects of the present invention.

Referring to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facet analysis processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
    receiving a query search context for querying documents of a document set, the query search context including a search document to be analyzed;
    retrieving, by similar document search processing, a similar document subset of the document set, the similar document subset comprising documents of the document set most similar to the search document of the query search context;
    generating, via facet analysis processing of the query search context, including the search document, M candidate facets most-related to the query search context, wherein M≥2, and the facet analysis processing determines for a facet an extent of correlation to the query search context to facilitate determining the M candidate facets most-related to the query search context;
    identifying facets of the M candidate facets associated with the documents of the similar document subset;
    classifying identified facets associated with the documents of the similar document subset into a positive facet set and a negative facet set based, at least in part, on extent of facet commonality across the documents of the similar document subset, the positive facet set including a facet of the identified facets associated with multiple documents of the similar document subset and the negative facet set including any facet of the identified facets associated with only one document of the similar document subset; and
    providing, at least in part, a listing of the documents of the similar document subset, the listing highlighting facets of the positive facet set in the documents of the similar document subset.

2. The computer-implemented method of claim 1, wherein the providing further comprises providing, at least in part, the listing of the documents of the similar document subset with facets of the negative facet set in the documents of the similar document subset highlighted differently from the highlighting of the facets of the positive facet set in the documents of the similar document subset.

3. The computer-implemented method of claim 2, further comprising:
    identifying one or more facets of the M candidate facets associated with the search document of the query search context; and
    wherein the classifying comprises classifying identified facets into the positive facet set and the negative facet set based on extent of facet commonality across the search document and the documents of the similar document subset.

4. The computer-implemented method of claim 3, wherein the classifying comprises classifying a facet of the identified facets into the positive facet set where the facet is associated with the search document and associated with multiple documents of the similar document subset, and classifying a facet of the identified facets into the negative facet set where that facet is only associated with the search document, or only associated with a document of the similar document subset.

5. The computer-implemented method of claim 3, wherein the providing comprises displaying, at least in part, the documents of the similar document subset on a display for a user, and the highlighting comprises highlighting on the display facets of the positive facet set associated with the documents of the similar document subset, and differently highlighting on the display facets of the negative facet set associated with the documents of the similar document subset.

6. The computer-implemented method of claim 5, wherein the listing displayed comprises a highlight of facets of the positive facet set associated with the documents of the similar document subset using a first color, and a highlighting of facets of the negative facet set associated with the documents of the similar document subset using a second color.

7. The computer-implemented method of claim 1, wherein the identifying the one or more facets of the M candidate facets associated with the documents of the similar document subset comprises identifying, for each document of the similar document subset, any facets of the M candidate facets associated with that document, the identifying producing an associated facet set for each document of the similar document subset, each associated facet set containing any facets of the M candidate facets generated as most-related to the search context, and wherein the classifying includes using the associated facet sets of the documents of the similar document subset in determining the extent of facet commonality across the documents of the similar document subset.

8. The computer-implemented method of claim 1, wherein the query search context is received from a user, and the providing comprises presenting to the user, at least in part, the listing of the documents of the similar document subset in ranked order of similarity to the search document of the query search context, along with the highlighting of the facets of the positive facet set in the documents.

9. The computer-implemented method of claim 1, wherein the search document is a natural language search document, and documents of the document set are natural language documents.

10. A computer system comprising:
a memory; and
a processor in communication with the memory, wherein the computer system is configured to perform a method comprising:
receiving a query search context for querying documents of a document set, the query search context including a search document to be analyzed;
retrieving, by similar document search processing, a similar document subset of the document set, the similar document subset comprising documents of the document set most similar to the search document of the query search context;
generating, via facet analysis processing of the query search context, including the search document, M candidate facets most-related to the query search context, wherein M>2, and the facet analysis processing determines for a facet an extent of correlation to the query search context to facilitate determining the M candidate facets most-related to the query search context;
identifying facets of the M candidate facets associated with the documents of the similar document subset;
classifying identified facets associated with the documents of the similar document subset into a positive facet set and a negative facet set based, at least in part, on extent of facet commonality across the documents of the similar document subset, the positive facet set including a facet of the identified facets associated with multiple documents of the similar document subset and the negative facet set including any facet of the identified facets associated with only one document of the similar document subset; and
providing, at least in part, a listing of the documents of the similar document subset, the listing highlighting facets of the positive facet set in the documents of the similar document subset.

11. The computer system of claim 10, wherein the providing further comprises providing, at least in part, the listing of the documents of the similar document subset with facets of the negative facet set in the documents of the similar document subset highlighted differently from the highlighting of the facets of the positive facet set in the documents of the similar document subset.

12. The computer system of claim 11, further comprising:
identifying one or more facets of the M candidate facets associated with the search document of the query search context; and
wherein the classifying comprises classifying identified facets into the positive facet set and the negative facet set based on extent of facet commonality across the search document and the documents of the similar document subset.

13. The computer system of claim 12, wherein the classifying comprises classifying a facet of the identified facets into the positive facet set where the facet is associated with the search document and associated with multiple documents of the similar document subset, and classifying a facet of the identified facets into the negative facet set where that facet is only associated with the search document, or only associated with a document of the similar document subset.

14. The computer system of claim 12, wherein the providing comprises displaying, at least in part, the documents of the similar document subset on a display for a user, and the highlighting comprises highlighting on the display facets of the positive facet set associated with the documents of the similar document subset, and differently highlighting on the display facets of the negative facet set associated with the documents of the similar document sub set.

15. The computer system of claim 14, wherein the listing displayed comprises a highlight of facets of the positive facet set associated with the documents of the similar document subset using a first color, and a highlighting of facets of the negative facet set associated with the documents of the similar document subset using a second color.

16. The computer system of claim 10, wherein the query search context is received from a user, and the providing comprises presenting to the user, at least in part, the listing of the documents of the similar document subset in ranked order of similarity to the search document of the query search context, along with the highlighting of the facets of the positive facet set in the documents.

17. A computer program product comprising:
at least one computer-readable storage medium readable by a processing circuit and storing instructions for execution by the processing circuit for performing a method comprising:
receiving a query search context for querying documents of a document set, the query search context including a search document to be analyzed;
retrieving, by similar document search processing, a similar document subset of the document set, the similar document subset comprising documents of the document set most similar to the search document of the query search context;
generating, via facet analysis processing of the query search context, including the search document, M candidate facets most-related to the query search context, wherein M>2, and the facet analysis processing determines for a facet an extent of correlation to the query search context to facilitate determining the M candidate facets most-related to the query search context;
identifying facets of the M candidate facets associated with the documents of the similar document subset;
classifying identified facets associated with the documents of the similar document subset into a positive facet set and a negative facet set based, at least in part, on extent of facet commonality across the documents of the similar document subset, the positive facet set including a facet of the identified facets associated with multiple documents of the similar document subset and the negative facet set including any facet of the identified facets associated with only one document of the similar document subset; and
providing, at least in part, a listing of the documents of the similar document subset, the listing highlighting facets of the positive facet set in the documents of the similar document subset.

18. The computer program product of claim 17, wherein the providing further comprises providing, at least in part, the listing of the documents of the similar document subset with facets of the negative facet set in the documents of the similar document subset highlighted differently from the highlighting of the facets of the positive facet set in the documents of the similar document subset.

19. The computer program product of claim 18, further comprising:
identifying one or more facets of the M candidate facets associated with the search document of the query search context; and
wherein the classifying comprises classifying identified facets into the positive facet set and the negative facet set based on extent of facet commonality across the search document and the documents of the similar document subset.

20. The computer program product of claim 19, wherein the classifying comprises classifying a facet of the identified facets into the positive facet set where the facet is associated with the search document and associated with multiple documents of the similar document subset, and classifying a facet of the identified facets into the negative facet set where that facet is only associated with the search document, or only associated with a document of the similar document subset.

\* \* \* \* \*